(No Model.) 4 Sheets—Sheet 2.
T. B. FOGARTY.
PROCESS OF AND APPARATUS FOR MAKING AMMONIA.
No. 288,323. Patented Nov. 13, 1883.
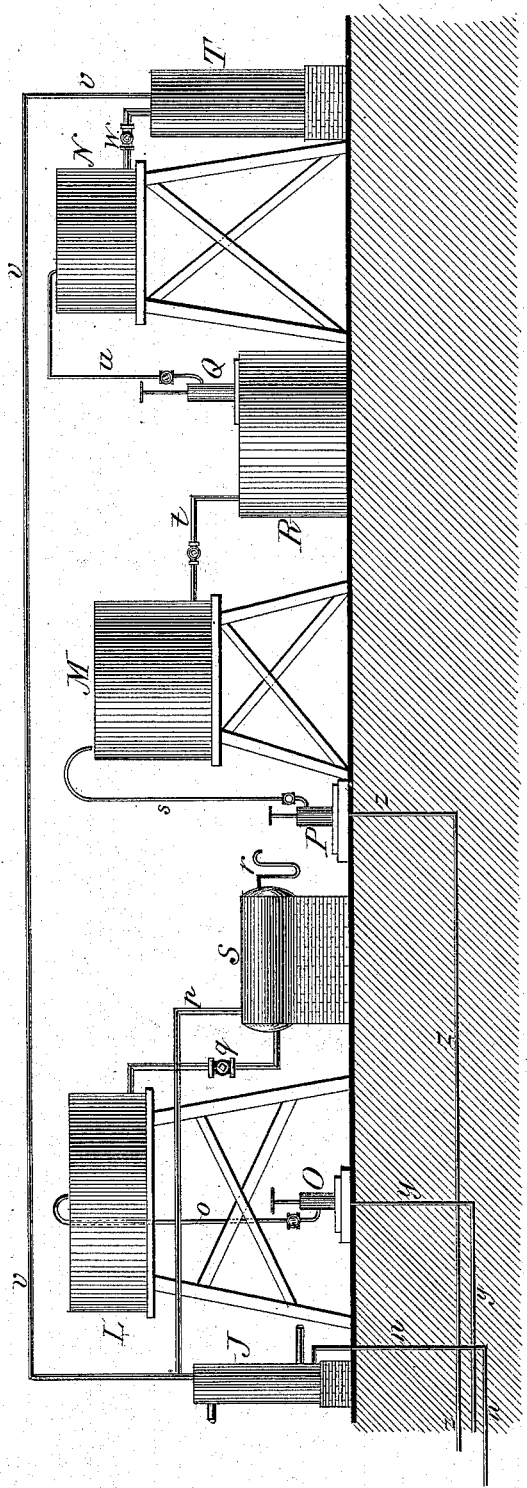

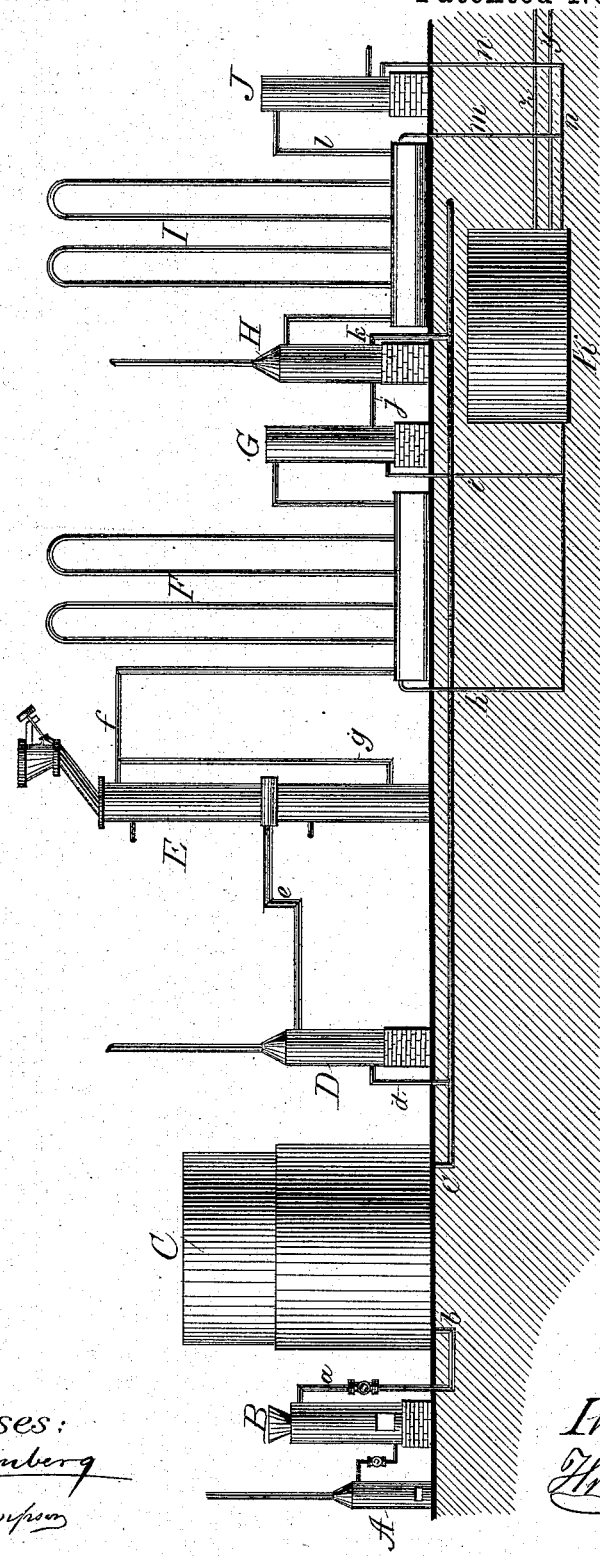

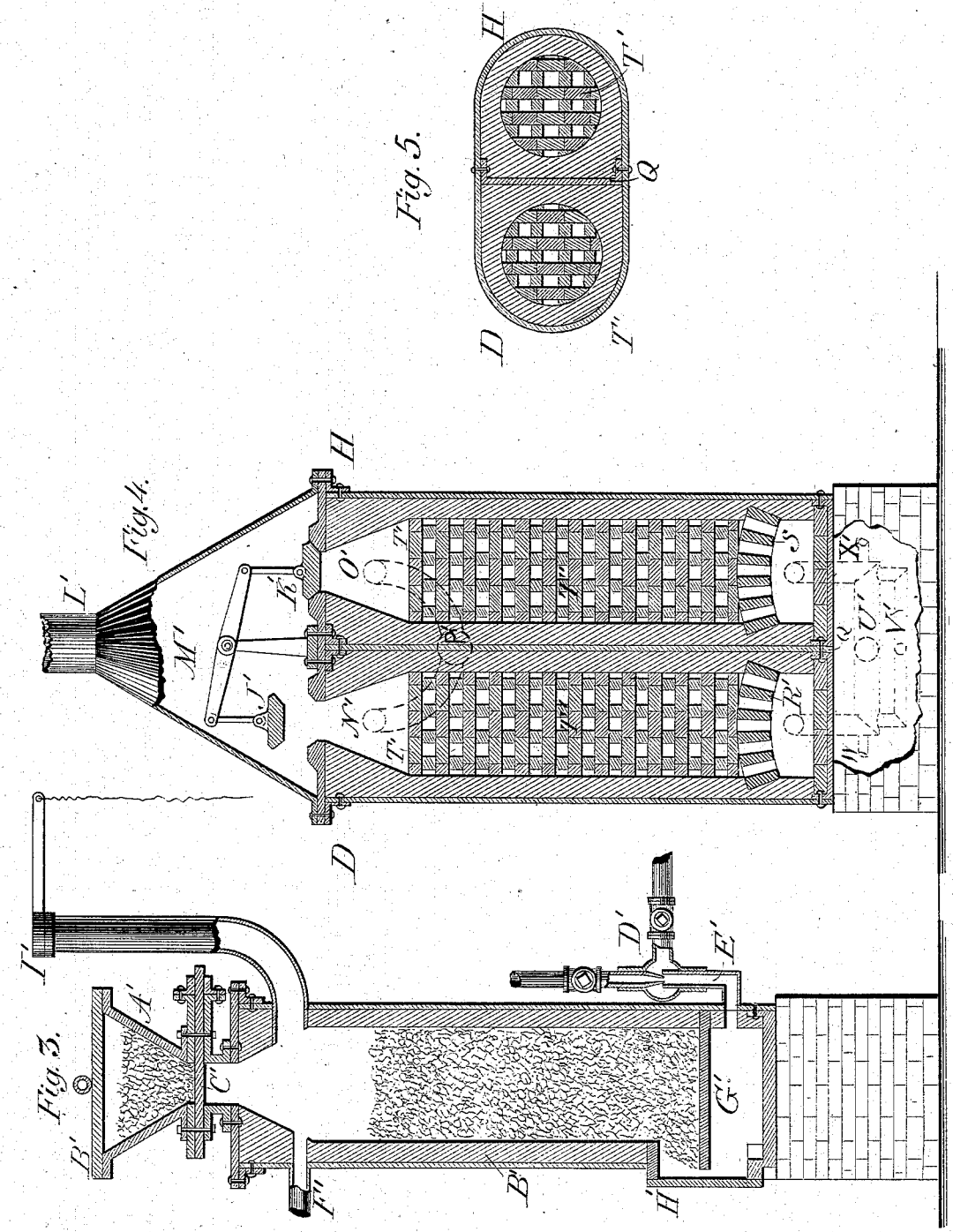

(No Model.) 4 Sheets—Sheet 4.
T. B. FOGARTY.
PROCESS OF AND APPARATUS FOR MAKING AMMONIA.
No. 288,323. Patented Nov. 13, 1883.
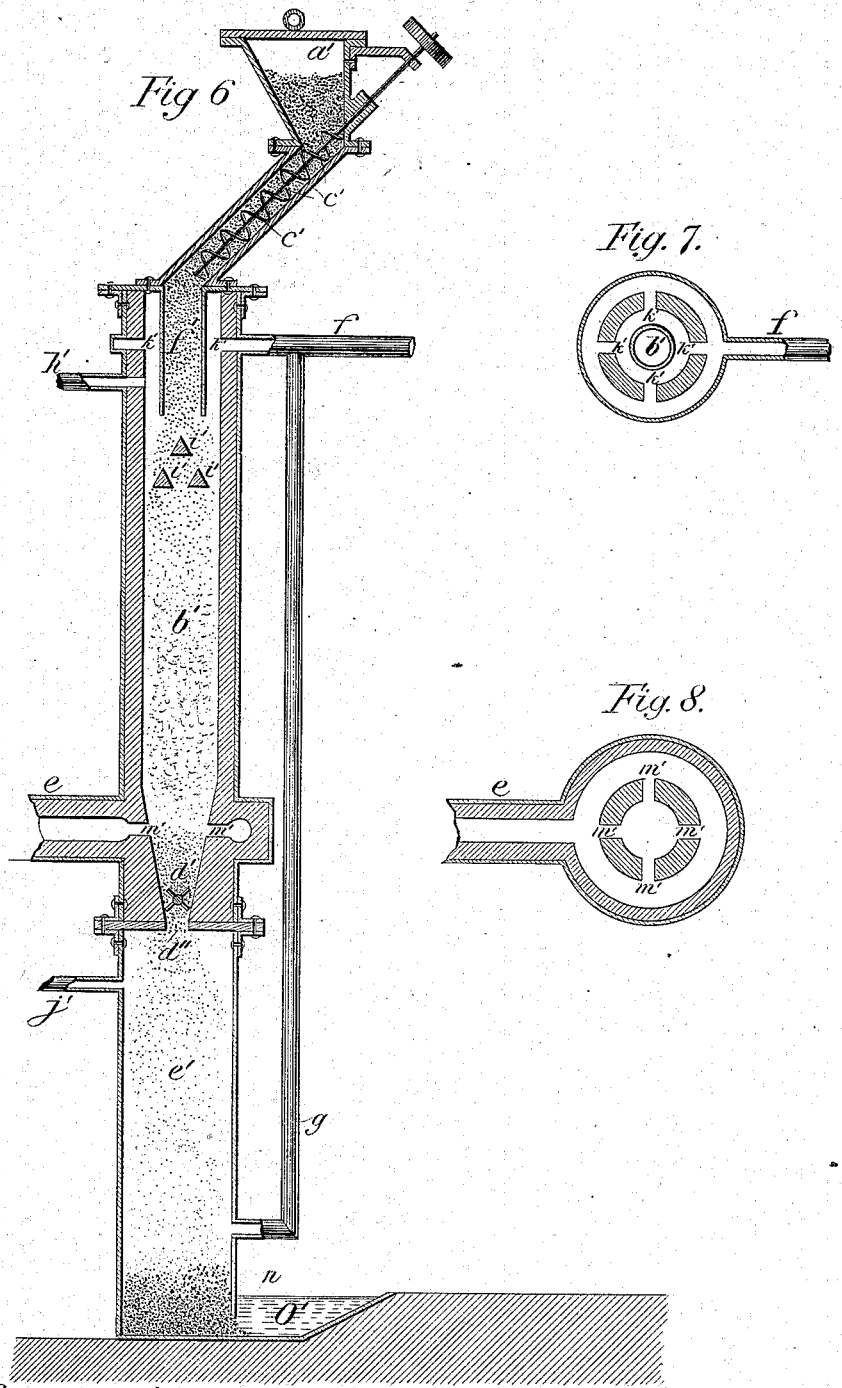

UNITED STATES PATENT OFFICE.

THOMAS B. FOGARTY, OF BROOKLYN, NEW YORK.

PROCESS OF AND APPARATUS FOR MAKING AMMONIA.

SPECIFICATION forming part of Letters Patent No. 288,223, dated November 13, 1883.

Application filed September 19, 1882. (No model.)

*To all whom it may concern:*

Be it known that I, THOMAS B. FOGARTY, of the city of Brooklyn, county of Kings, and State of New York, have invented a new and useful Process of and Apparatus for Manufacturing Ammonia; and I hereby declare the following to be a full, clear and exact specification of the same, reference being had to the accompanying drawings, forming a part of this specification.

The object of my invention is to obtain ammonia in a simple and economical manner by producing it from atmospheric nitrogen and the hydrogen of decomposed steam. It is well understood that ammonia cannot be practically produced upon a large scale by the direct synthesis of its elements; but it is at the same time well known that there is no practical obstacle in the way of the artificial production of cyanogen, and that this having been produced, as an intermediate step, its conversion into ammonia is an easy matter. It is well known, also, that it is extremely difficult to effect the direct combination of nitrogen and carbon—the elements of cyanogen—even at a high temperature. If, however, an alkali or an alkaline earth, or, indeed, any substance capable of combining with cyanogen, or capable of yielding up any substance capable of combining with cyanogen, be present, combination is easily effected, the cyanogen produced combining with the alkali and forming a cyanide or cyanate thereof. Taking advantage of this disposition of incandescent nitrogen and carbon to combine in the presence of an alkali, I submit carbon and alkali, suitably mixed and raised to incandescence, to the action of incandescent nitrogen in a close furnace or cupola, producing cyanides and cyanates of the alkali used, and afterward decompose these cyanides and cyanates by steam, producing ammonia and oxides of carbon, and causing the alkali to return to its original state, or to enter into fresh combinations. It is also known that cyanogen is very combustible, and is rapidly consumed in the presence of oxygen, or of substances containing oxygen and capable of yielding it to it, but that it is not affected by hydrogen, carbonic oxide, or carbonic acid, and consequently the inference is obvious that the products of the combustion which takes place in any ordinary fire are capable of exerting but little injurious influence upon cyanogen, and, containing, as they do, a very large percentage of free nitrogen, are an excellent source of nitrogen for the manufacture of ammonia. The gases produced by the decomposition of steam and air by incandescent carbon in a close furnace or cupola, and which are known as "generator-gases," when deprived of the undecomposed steam which usually accompanies such gases, consisting, as they principally do, of hydrogen, carbonic oxide, carbonic acid, and free nitrogen, and containing no free oxygen, are also incapable of entering into combustion with or of decomposing cyanogen or its compounds, and are consequently admirably adapted to the purpose of producing cyanogen. These gases have, moreover, the further advantage of being highly combustible, and of being well adapted for use as fuel in manufacturing operations where an intense heat is required, as is the case of the manufacture of ammonia from atmospheric nitrogen, and consequently I find it highly advantageous to use these gases in preference to any other as a source of nitrogen for the production of ammonia, as well as a most reliable, economical, and efficient fuel, and one well adapted for use as a source of heat in those operations connected with my process which require a high temperature.

I shall now proceed to describe my invention so fully and clearly that any person skilled in the art of making ammonia may be able to understand and practice the same; and for this purpose I shall divide or classify it into and under three different parts or heads, consisting, first, in the manufacture of a cheap heating-gas consisting, chiefly, of nitrogen, hydrogen, carbonic oxide, and carbonic acid; second, in superheating the generator-gas with the decomposition of the contained undecomposed steam by means of the carbonic oxide in the gas itself; third, in an improved process of and apparatus for converting the nitrogen in the superheated generator-gas into ammonia.

I shall now proceed to describe in detail the several parts of my invention, their connection with each other, and the manner of their combination into a perfect and continuous process.

In carrying out the first part of my invention I admit steam, preferably superheated, to a close cupola, furnace, or retort of any suitable form or construction, filled or partly filled with incandescent carbon—such as coal, coke, charcoal, or peat—and in conjunction with such steam, and by means of any suitable pump, jet, aspirator, or exhauster, I suck or draw or force into and through the incandescent carbon contained in said cupola, furnace, or retort, a suitable volume of atmospheric air. I am careful that the volume of air admitted to the cupola may bear such a proportion to that of the steam, and also to the requirements of the combustion taking place within the cupola, that the oxygen contained in such air will be barely capable of supporting the combustion sufficiently to overcome and counteract the cooling effect of the decomposition of the steam, and am thus enabled to maintain an even and uniform temperature in the cupola, suitable provision of course being made for feeding and cleaning the fire. The steam and air upon one side and the fuel upon the other will now combine with each other to form a highly combustible gas, which will vary in composition according to the temperature of the furnace or cupola, the relative proportions of the steam and air, and the greater or less thickness of incandescent fuel through which it has passed, but, under suitable conditions, having an average composition about as follows: carbonic acid, ten per cent.; carbonic oxide, seventeen per cent.; hydrogen, thirteen per cent.; and nitrogen, sixty per cent.

The second part of my invention relates to the superheating of the crude generator-gas and the decomposition of its undecomposed steam by means of the carbonic oxide in the gas itself. Preparatory to converting the nitrogen in the crude generator-gas into ammonia I now cause the crude gas to pass through a suitable superheater of any approved construction, wherein it is raised to a high state of incandescence, by which means I attain a double end. In the first place, the undecomposed steam which is nearly always present in crude generator-gas is decomposed by the carbonic oxide of the crude gas itself, the latter being thus freed from its moisture and prepared for the next operation; and, in the next place, the extremely high temperature which the gas attains in the superheater renders it capable of effecting by its own heat the combination of the nitrogen it contains with carbon and alkali, as will be explained in describing the next stage of the process. My next step toward the conversion of the nitrogen of the crude generator-gas into ammonia consists in causing the crude gas to pass through a suitably-constructed cupola or furnace, wherein it mingles with and raises to its own high temperature a mass of mixed carbon and alkali contained within it. Under the influence of the high temperature the alkalized carbon in the cupola now combines with the nitrogen of the gas to form alkaline cyanides, which, being brought into contact with steam at a reduced temperature, produce ammonia, the carbon which they contain being converted into carbonic oxide and carbonic acid, and their alkali returning to its original state or entering into fresh combinations. The variety and form of carbon used and the manner in which it is mixed, compounded, or combined are in a great measure matters of convenience and economy, for nearly all the common varieties of carbonaceous fuel may be advantageously employed for the production of alkaline cyanides. It is, however, desirable that the carbon used, whether in the form of coke, coal, charcoal, or other carbonaceous fuel, should be mixed with the alkali as intimately as can practically be done, and that this alkalized carbon should be introduced into the cupola or furnace in as finely divided a state as may be consistent with the maintenance of a suitable draft or passage for the gas through it, with the view of presenting to the action of the incandescent nitrogen as large a surface and as permeable a body of alkalized carbon as can practically be done, for which reason the form in which the alkalized fuel is introduced into the furnace and the manner of its introduction must be varied according to the nature and condition of the material employed, the nature and extent of this variation depending upon the nature of the alkali used equally as much as on that of the fuel. The alkaline cyanides formed by the combination, at a high or incandescent temperature, of the nitrogen in the crude generator-gas with alkalized carbon, as just described, are now decomposed by steam at a lower temperature, the hydrogen of the steam combining with the nitrogen of the cyanogen to form ammonia, while its oxygen combines with the carbon of the cyanogen to form carbonic oxide and carbonic acid, and the alkali is set free and returns to its original state or enters into fresh combinations.

The annexed drawings illustrate and are a part of this specification.

Figures 1 and 2 show in elevation, continuously and on a small scale, a connected view of the principal parts of the apparatus, in which A is an ordinary steam-boiler; B, a furnace or cupola for generating the crude nitrogenous gas; C, an ordinary gas-holder; D and H, superheaters, and E the ammonia-furnace.

Fig. 3 is a section in detail of the furnace or cupola B, Fig. 1, for producing nitrogenous gas, in which A' is the hopper; B', the hopper-cover; C', the hopper-valve; D', the steam-jet; E', the induction-pipe; F', the gas-outlet; G', the ash-pit; H', the furnace-door, and I' the chimney-valve.

Figs. 4 and 5 are sections in detail of the superheaters D and H, Fig. 1, in which the letters D and H denote, respectively, the left and right hand chambers; J' and K', respectively, the valves which permit the escape of products of combustion from the chambers D' and H'; L', the chimney-valve; M', the hood; N' and O', respectively, outlet-pipes from D and H; P', a discharge-pipe common to outlets N' and O'; Q', a partition-wall between the chambers D and H; R' and S', perforated arches supporting the brick filling T' of the chambers D and H; and W' and X', respectively, steam-inlets to D and H.

Fig. 6 is a vertical and Figs. 7 and 8 are horizontal sections of the ammonia-furnace E, Fig. 1, in which $a'$ is a hopper for feeding alkalized carbon in powder to the upper chamber, $b'$, of the furnace. $c'$ is an Archimedean screw for transferring the pulverized material continuously from the hopper $a'$ to the chamber $b'$. $d'$ is a rotary valve or extractor for transferring the cyanidized material from the chamber $b'$ to the chamber $e'$. $f'$ is an ajutage attached to the top of the furnace on the inner side. $f$ is an outlet-pipe for gas escaping from the chamber $b'$. $h'$ is a pipe for introducing steam into $b'$. $i'$ $i'$ $i'$ are deflectors or dispersers, made of some refractory material. $e$ is a pipe for introducing nitrogenous gas to the chamber $b'$. $j'$ is a pipe for introducing steam into the chamber $e'$. $g$ is an outlet for gas, leading from the chamber $e'$. $k'$ $k'$ are tuyeres or nostrils for the escape of gas from $b'$. $m'$ $m'$ are tuyeres for distributing in the chamber $b'$ the incandescent nitrogenous gas received through the pipe $e$. $n'$ is an opening at the bottom of the chamber $e'$ for the purpose of extracting the spent material, and $o'$ is a water-pan, by the water in which the opening $n'$ is sealed and rendered gas-tight.

The mode of operation is as follows: I first suitably charge the generator-furnace A, Fig. 1, with coal, coke, charcoal, or any other suitable form of carbon, and, having ignited it, permit it to burn until it becomes incandescent, at least to a considerable degree. I now close the furnace-door H', Fig. 3, and the chimney-valve I, and by means of a suitable jet-pump or aspirator, D', force suitably-adjusted volumes of steam and air into the closed ash-pit G'. The mingled stream of steam and air is now forced upward through the mass of incandescent fuel in the cupola, and is decomposed by it, forming what is known as a "generator-gas," the hydrogen and nitrogen of the steam and air passing on unchanged, while their oxygen combines with the carbon of the coal or other fuel to form carbonic oxide or carbonic acid in proportions which vary according to the relative volumes of steam and air, the temperature of the furnace, and the greater or less thickness of incandescent fuel which it contains. The generator-gas thus produced also contains some sulphurous impurities and a large volume of undecomposed steam. The generator-gas is now permitted to escape from the cupola through the outlet F', and its production will be uniform and continuous if care be taken to clean and replenish the fire at proper intervals. Its quality, too, will be constant and uniform, if the firing is regular and the supply and relative proportions of steam and air are suitably adjusted. From the cupola my generator-gas passes into the gas-holder C, which it enters through the inlet $b$, Fig. 1. Although this gas-holder is by no means necessary to the operation of the process, yet it is of advantage to use it, as it serves to equalize the functions of the generator with those of the remainder of the apparatus, serving as a sort of stock-chamber. From the gas-holder the gas passes through the outlet $c$ and pipe $d$ into the superheater D, Fig. 1, which is shown in section and detail in Figs. 4 and 5, and may be described as two cupolas united together and inclosed in a single external casing, but separated and made practically distinct from each other by means of the partition Q', Figs. 4 and 5. It will be seen by reference to Fig. 4 that these cupolas are respectively provided with outlets N' and O', air-supply pipe $u'$, and gas-pipe $v'$. These inlets and outlets are provided with suitable cocks and valves, (not shown in the drawings,) by means of which communication may be opened with either cupola and cut off from the other simultaneously, or nearly so. I also provide the superheater with suitable valves, J' and K', Fig. 4, by means of which the gases escaping into the chambers can be permitted to pass into the chimney from either chamber at will, and also one valve can be opened and the other closed simultaneously, or nearly so. As shown in the drawings, the valve J is open for the escape into the chimney of the products of combustion. At the bottom the superheater is provided with fire-brick grates or perforated arches R' and S', and over these it is filled with courses of fire-brick, as in Siemens furnaces, in order that the products of combustion and other gases may be able to pass freely through them.

The manner of using the superheater is as follows: I first open the chimney-valve J' of the chamber D, Fig. 4, and ignite a suitably-adjusted stream of air and generator-gas, which is admitted to the chamber through $u'$ and $v'$. The combustion of this gas creates an intense heat, and the incandescent products of such combustion, being raised to an extremely high temperature and passing upward through the interstices of the fire-brick filling, soon raise the bricks to their own temperature, whereupon the cocks and valves are reversed, and the chamber H is heated in like manner, when the superheater is ready for use, for while chamber D is being heated by the combustion taking place within it a regulated quantity of unburned generator-gas may be caused to pass through the chamber H, the valve K' of which is closed, and to escape through the outlet O' and pipe P' to the ammonia-furnace E, Fig. 1, having been raised to an intense heat in its passage through the superheater. It is evident that a portion of the generator-gas may in this way be used advantageously for fuel, and may be made to heat one side of the superheater, while another portion of the same gas may be simultaneously heated in the other side. It is also evident that a most intense heat can be thus imparted to the generator-gas passing through the superheater, and that it is only necessary to see that this gas does not lose its heat in passing through the pipe $e$, Fig. 1, in order to cause it to raise the contents of the ammonia-furnace to its own temperature. For this reason the pipe $e$ should in practice be as short as possible, and should be suitably protected by fire-brick or other refractory material. (See $e$, Figs. 6, 8.) It is further evident that in cases where from motives of economy it is desired to save the expense of constructing a double superheater, as described, a single one may be used with good effect, the same superheating-chamber being alternately heated and cooled, in which case the operation of the apparatus will be intermittent; also, that the gas may be advantageously caused to pass from the top downward through the superheater, and, being thus superheated, to pass from the bottom of the superheater into the ammonia-furnace.

I shall now proceed to describe the construction and operation of the ammonia-furnace E, Fig. 1. (Shown in section and detail in Figs. 6, 7, and 8.)

I construct my ammonia-furnace, Figs. 6, 7, and 8, preferably as a vertical cylinder or cupola, and provide it at some suitable point with a vertical chute or funnel, $d''$, preferably contracted at the lower end. I also provide my ammonia-furnace at top with a suitable cover, and adapt to such cover a suitable hopper, $a'$, and connect this hopper with a suitable screw, $c'$, which I operate at any desired rate of speed by any suitable mechanical means, and by means of which the alkalized fuel, as will be hereinafter described, may be fed continuously and at any desired rate from the hopper $a'$ to the chamber $b'$. I also find it advantageous to connect, upon the lower side of the cover of the ammonia-furnace and at the lower end of the Archimedean screw the chute $f'$, which serves to separate the descending material from the gases ascending through the annular space surrounding it. This chute also serves to carry or convey the pulverized material used in the process past the nostrils $k\ k$ and out of danger of being drawn into and choking them, and at the same time it directs the pulverized fuel upon the deflectors $i'\ i'\ i'$, by means of which it is scattered through the furnace. I suitably line the chamber $b'$ of my ammonia-furnace with fire-brick or some other refractory material, and provide it with a suitable steam-pipe, $h'$, and outlet $f$.

Fig. 7 shows the manner in which the gases escape from the chamber $b'$ through the nostrils $k'\ k'$ and the pipe $f$.

$m'\ m'$, Fig. 8, show the tuyeres, through which the heated gases leaving the superheater by the pipe $e$ are admitted into the chamber $b'$ of the ammonia-furnace.

In the funnel $d^4$, I place the extractor $d'$, which I operate at any desired rate of speed by any suitable mechanical means, and by means of which I am enabled to discharge into the chamber $e'$ at any desired rate of speed the cyanidized carbon and alkali that falls through the chamber $b'$. The lower chamber, $e'$, communicates through the chute $d'''$ with the chamber $b'$, from which it is fed with the cyanidized alkaline mixture by means of the extractor $d'$. It is provided with a steam-inlet, $j'$, a gas-outlet, $g$, and for the removal of spent material has at bottom an opening, $n'$, suitably sealed in a water-tank, $o'$.

The manner of using the ammonia-furnace is this: I mix coal, coke, charcoal, peat, or any suitable carbonaceous fuel in suitable proportions with any suitable alkali or alkaline earth, (from economical considerations I prefer to use lime mixed in suitable proportions with common salt, or, what is better, slaked with a strong solution of common salt, chloride of sodium,) and having reduced the alkaline mixture to a powder or finely-comminuted state by grinding or by any other suitable mechanical means I place such powder in the hopper $a'$, whence by means of a screw, $c'$, or by any other suitable mechanical means I feed it continuously and at any desired rate of speed through the chute $f'$ into the chamber $b'$, through which it is scattered by the deflectors $i'\ i'\ i'$. At the same time I admit to the chamber $b'$ through the tuyeres $m'\ m'$ a regulated stream of nitrogenous gas which has been raised to a high state of incandescence. This volume of incandescent gas passes upward through the chamber, and, being brought into intimate mixture and contact with the falling mass of pulverized alkaline fuel, instantaneously raises it to its own high temperature, the nitrogen of the incandescent gas combining with the carbon and alkali of the alkalized fuel to form cyanogen or alkaline cyanides or cyanates, and the combustible gases passing off through the outlet $f$, mixed with some ammonia formed by the decomposition of the cyanogen or volatile cyanides present, by means of a regulated stream of steam admitted through the pipe $h'$. Meanwhile the solid cyanides produced in the chamber $b'$ fall into the chute $d'$, whence they are caused to pass at any desired rate of speed into the lower chamber, $e'$, in falling through which they meet with a volume of steam admitted through the pipe $j'$, and are decomposed by it, the nitrogen which they contain being converted into ammonia, their carbon becoming carbonic oxide and carbonic acid, and their alkali returning to its original state or entering into fresh combinations. The volume of steam admitted through $j'$ must be regulated more with a view of maintaining the temperature of the chamber $e'$ at a point suitable to the decomposition of the alkaline cyanides and the formation and preservation of ammonia than with that of supplying a mere equivalent of steam. The mixture of undecomposed cyanides, alkalized carbon, clinker, and ashes which falls to the bottom of the chamber $e'$ is received in a suitable pan or other reservoir of water, $o'$, and may be removed through an opening, $n'$, suitably sealed in the water in the pan $o'$. The ammonia produced in the chamber $e'$ escapes, mixed with steam and gas, through the pipe $g$, and joins the volume of mixed gases escaping through the pipe $f$.

It usually happens that at the end of the process there will be a large volume of heating-gas left over from the operation, and it is scarcely necessary to add that this may be turned to account by being used or sold for heating purposes, or by being carbureted and used or sold as illuminating-gas.

I do not bind or confine myself to the exact process or succession of processes or to the exact form of apparatus described, for it is very evident that in a continuous and extended process like my invention the several processes, sub-processes, or divisions of the general process and the details and exact order and succession of the same may be varied indefinitely, the same being true of the form, construction, and management of the apparatus.

What I claim, and desire to secure by Letters Patent, is—

1. The process herein described of producing ammonia, substantially as follows: first, injecting air and steam into or through incandescent carbon contained in a suitable furnace, causing the air and steam to combine with the carbon and to produce carbonic oxide and carbonic acid, the hydrogen of the decomposed steam and the nitrogen of the air being at the same time set free; second, in superheating the crude generator-gas produced in the first sub-process, raising it to a high or incandescent temperature, and causing the undecomposed steam in the crude gas to be decomposed by the carbonic oxide contained in the gas itself; third, in the conversion of the nitrogen in the crude generator-gas into ammonia, said conversion being effected by causing the generator-gas raised to incandescence in the second sub-process to meet a falling or moving volume of carbon and alkali reduced to a pulverulent or finely-divided state, commingling and mixing intimately with such carbon and alkali, raising them to its own high or incandescent temperature, causing the nitrogen it contains to combine with such carbon and alkali, producing cyanogen, and decomposing the cyanogen so produced by steam, producing ammonia, substantially as described.

2. In a process for producing ammonia, the process of, first, superheating gas containing nitrogen, and raising it to a high or incandescent temperature; second, causing such gas so raised to incandescence to mingle with a moving volume of carbon and alkali reduced to a pulverulent or finely-divided state, and raising such pulverized carbon and alkali to a high or incandescent temperature, the nitrogen contained in the gas combining with the carbon and alkali and producing cyanogen, substantially as described.

3. In a process for producing ammonia in which the nitrogen of incandescent nitrogenous gas is caused to combine with pulverized carbon and alkali, producing cyanogen and alkaline cyanides, the process of decomposing the cyanides so formed by means of steam, converting them into ammonia, and simultaneously controlling the temperature at which the ammonia is formed by properly adjusting to each other the amount of falling cyanidized carbon and the volume of the steam by which the decomposition is effected, substantially as described.

4. In an apparatus for producing ammonia, the combination of the generator-furnace B and superheater D with the ammonia-furnace E, consisting of the chambers $b'$ and $e'$, and provided with the hopper $a'$, feeding-screw $c'$, and extractor $d'$, constructed and operated substantially as described.

5. In a vertical retort or furnace of an apparatus for producing ammonia, the combination of the hopper $a'$, screw $c'$, chute $f'$, and deflectors $i'$ $i'$ $i'$, constructed and operated substantially as described.

6. In an apparatus for producing ammonia, the vertical retort E, provided with the hopper $a'$, screw $c'$, and extractor $d'$, constructed and operated substantially as described.

In testimony whereof I have signed my name to this specification before two subcribing witnesses.

THOS. B. FOGARTY.

Witnesses:
CHARLES COPPINGER,
EDWIN F. COREY.